Patented Apr. 1, 1947

2,418,270

UNITED STATES PATENT OFFICE 2,418,270

PREPARATION OF CATALYSTS COMPRISING SUPPORTED CHROMIUM OXIDE

Maryan P. Matuszak, Bartlesville, Okla., assignor to Phillips Petroleum Company, a corporation of Delaware No Drawing. Application May 27, 1943, Serial No. 488,739

5 Claims. (Cl. 252—251)

This invention relates to the preparation and use of catalysts, and more particularly it relates to supported catalysts which have one or more metal oxides as active ingredients. In one of its more specific aspects, it relates to the catalytic treatment of a hydrocarbon to yield an unsaturated hydrocarbon containing fewer hydrogen atoms but the same number of carbon atoms.

The preparation of supported catalysts in accordance with common practice has generally involved either coprecipitation of the active ingredient and the supporting material or impregnation of the supporting material with the active metallic ingredient in the form of an aqueous solution of a salt that upon being heated decomposes to the desired metal oxide. In many instances, however, the decomposition of a salt produces a metal oxide having relatively inferior properties, and is consequently to be avoided. In a method described in the copending application of Glen H. Morey, Serial Number 359,295, filed Octover 1, 1940, which has issued as Pat. No. 2,339,349, the active ingredient is added to the support in the form of an aqueous sol; the sol is then precipitated on or in the supporting material with an aqueous solution of an alkali, and the resulting supported hydrous oxide or hydroxide is dried and heated to form the desired catalytic oxide. A difficulty encountered in this method is that the final precipitation causes the formation of such an exceedingly voluminous hydrous oxide that much of the catalytic material oozes from the pores of the support and eventually forms a loose powder, or "fines," inadequately supported or not supported at all. Also, the support granules in considerable proportion are split or broken apart by the pressure developed in the formation of the voluminous hydrous oxide within the pores of the support. As a result, a considerable loss of catalytic material occurs; and, in use, the finished catalyst, because of the presence of particles of various sizes and shapes, undergoes considerable packing and/or channeling, whereby proper control of the contacting is made exceedingly difficult or impossible, especially if the catalyst is disposed in a system of tubes or chambers connected in parallel. In a method described in the copending application of James R. Owen, Serial No. 478,032, filed March 4, 1943, the active ingredient is similarly added to the support in the form of a hydrosol, but the resulting impregnated material is treated with an excess of substantially anhydrous ammonia, whereby the desired catalytic metal oxide is formed without the disruption of the support granules that occurs if precipitation in the ordinary wet way is practiced.

An object of this invention is to simplify the preparation of supported metal oxide catalysts.

Another object is to effect an economy by reducing the proportion of alkali precipitant used in the preparation of supported metal oxide catalysts.

Another object is to utilize the supported catalysts prepared as disclosed herein for the catalytic treatment and/or conversion of hydrocarbons, such as dehydrogenation, hydrogenation, dehydrocyclization, desulfurization, dehalogenation, isomerization, and the like.

Other objects and advantages of the invention will be evident to those skilled in the art from the following description and the appended claims.

In accordance with one embodiment of this invention, a supported metal oxide catalyst of high activity and long life is prepared by impregnating a suitable difficulty fusible porous granular carrier with a hydrosol of a desired composition, and by drying the sol-impregnated carrier and igniting it to form the corresponding metal oxide or oxides. The hydrosol is economically prepared by adding to a concentrated solution of at least one polyvalent metal salt of a monobasic acid a concentrated solution of ammonia in an amount equal to about two thirds of the stoichiometric equivalent of the salt and digesting, if necessary, to redissolve and/or peptize any temporary precipitate.

In general, this invention is applicable to the preparation and use of any supported metal oxide catalyst in which one or more of the metal oxide ingredients are obtainable by precipitation as hydrous metal oxides from an aqueous solution of the corresponding salts. Because suitable hydrosols are more readily prepared from monobasic acids than from polybasic acids, salts of monobasic acids, such as acetic, formic, hydrochloric, and nitric are generally more advantageous than those of polybasic acids; of these monobasic acids, nitric acid is preferred because it forms generally highly soluble metal salts, so that the initial salt solution may be highly concentrated. One manner of practicing the invention and of obtaining its useful and novel advantages will be evident from the following description and examples relating to the preparation of supported chromium oxide catalysts, which are preferred and which are regarded as best exemplifying the invention.

A concentrated hydrosol comprising trivalent chromium is prepared in any convenient manner, for example, by melting or dissolving chromium nitrate in its own water of crystallization or in a minimum quantity of water, adding to the solution a concentrated solution of a soluble univalent alkaline hydroxide, preferably concentrated ammonium hydroxide, in a proportion just short of that required to form a permanent precipitate, usually a proportion stoichiometrically equivalent to about two thirds of the chromium nitrate, and digesting the resulting mixture for a time sufficient to peptize or redissolve any precipitated hydrous chromium oxide or hydroxide or basic chromium salt. If desired, salts of polyvalent metals of Groups II to VIII of the periodic table may be present together with the chromium nitrate. Salts of metals of Group III, especially aluminum, are usually exceptionally advantageous. Two thirds of the stoichiometrically equivalent amount of the soluble hydroxide is generally suitable; but in particular instances slightly more or slightly less may be somewhat more suitable, depending upon what salts of metals other than chromium are present; in any particular instance, the maximum proportion of alkaline hydroxide that can be added without producing a permanent precipitate may be readily determined by a small-scale trial. The alkaline solution used for the formation of the sol should be relatively concentrated, for example about 10 molar. Of the various alkali hydroxides, ammonium hydroxide is preferred, since its salts, being relatively volatile, are more readily removed by heat from the ultimate catalyst than those of potassium, sodium, lithium, etc. When ammonium hydroxide is used, 28 per cent commercial aqua ammonia, which is about 15 molar, is highly suitable. Any precipitate which is not redissolved or peptized upon digestion may be easily taken into solution by the addition of a small proportion of a concentrated monobasic acid, preferably nitric acid.

Suitable salts that may be used in this manner for the preparation of a concentrated hydrosol by melting or dissolving in the water of crystallization and adding a soluble alkaline hydroxide comprise nonahydrates, such as those of aluminum nitrate, chromic nitrate, and ferric nitrate; hexanitrates, such as those of cerous nitrate, cobalt nitrate, cupric nitrate, ferric chloride, ferric nitrate, lanthanum nitrate, magnesium nitrate, manganous nitrate, nickel nitrate, uranyl nitrate, zinc nitrate, and the nitrates of many of the rare-earth metals; and many other meltable hydrates of salts of monobasic acids and polyvalent metals. Whether hydrated or not, the salts may contain any of a number of polyvalent metals, among which are aluminum, beryllium, chromium, iron, copper, lanthanum, magnesium, manganese, nickel, rhodium, thorium, uranium, vanadium, zinc, zirconium, and rare-earth metals including cerium, praseodymium, neodymium, ytterbium, hafnium, tantalum, etc. Naturally, the selection of salts to be used in any particular catalyst preparation depends upon the proposed use of the catalyst; however, such selection can be readily made by those skilled in the art of preparing catalysts. For example, if the catalyst is to be used for the dehydrogenation of hydrocarbons, one or more of the salts of aluminum, chromium, uranium, vanadium, and zirconium may be advantageously selected; of these, at least one chromium salt should be preferably included, inasmuch as then the final catalyst contains chromium oxide, which is exceptionally advantageous for the dehydrogenation of hydrocarbons.

A method that is convenient for obtaining a suitable chromium oxide hydrosol from relatively impure material comprises dissolving or extracting a chromium-containing material, such as a deteriorated catalyst comprising green chromium oxide or sesquioxide, with hot concentrated sulfuric acid, preferably in the presence of a small proportion of hexavalent chromium, which acts as a dissolution catalyst; converting the dissolved chromium to the trivalent form if it is not already trivalent; adding an alkaline solution, preferably ammonia, to precipitate hydrous chromium oxide; decanting off excess liquid; and digesting the resulting precipitate with a proportion of monobasic acid, preferably nitric acid, sufficient to peptize or redissolve the precipitate but preferably not more than that stoichiometrically equivalent to about 50 per cent of the hydrous chromium oxide. Similar procedures may be employed for other metal oxides or for mixtures of oxides.

A porous carrier material, such as activated aluminum oxide, bauxite, silica gel, or the like, having granules of desired shape and size, is impregnated with the hydrosol. Excess water is removed by filtration and/or evaporation. Incorporation of the hydrosol on the carrier may be effected in various ways, as for example, by pouring the hydrosol over the carrier, stirring the mass, and removing excess liquid by decanting, filtering, or evaporating. The sol-impregnated carrier is dried and heated to convert the chromium hydrosol to chromium oxide.

In general, the support or carrier may be any granular porous material that is capable of withstanding elevated temperatures, up to about 700° C. or higher, and the conditions present during revivification of the catalyst by an oxygen-containing gas at an elevated temperature. Many such materials are known, such as pumice, silica gel, kieselguhr, unglazed porcelain, and the like. Of the materials which may be used as carriers, alumina and bauxite are usually preferred, mainly because they are readily available in large quantities of uniform quality at low cost and because they themselves are catalytic to some degree for the treatment of hydrocarbons. The carrier, in the form of granules of any desired size and shape, is preferably heated before use to a temperature of about 600° C., in order to expel volatile matter and to increase its porosity. Extraneous soluble or finely divided matter may be removed by vigorous washing with water; a preliminary chemical treatment, as with a dilute acid or alkali solution, is also sometimes advantageous. A size within the range of 4 to 40 mesh is usually most useful. Especially convenient in size and shape are generally cylindrical pellets of approximately equal diameter and length, preferably about one eighth or three sixteenths of an inch; they are especially desirable when made with somewhat rounded ends, which tend to eliminate undesired stacking and channeling.

The proportion of active metal oxide to carrier in the catalyst may be selected within a wide range; 5 to 25 per cent by weight of the final catalyst is preferred, but proportions outside this range may be used if desired.

The sol-impregnated carrier is then dried, preferably gradually, as by air-drying or evacuation at 60 to 70° C., followed by heating in hydrogen up to and in the range of about 200 to 250° C. until moisture appears to be neither formed nor liberated, and finally by heating in hydrogen or other nonoxidizing gas to 500° C. or higher. The resulting catalyst may be utilized directly, as for example for the dehydrogenation of hydrocarbons. However, in many instances, it is advantageous if the catalyst, prior to utilization, is treated with, or soaked in, an equal apparent volume of a dilute solution of an alkali-metal hydroxide or alkaline salt, such as 0.01 to 0.1 normal potassium hydroxide or carbonate, to remove or counteract a residual trace of difficultly volatilizable acid, which otherwise may impart an undesirable carbon-forming or polymerizing action to the catalyst. Care, however, should be taken not to bring into contact with the catalyst too much of such alkali-metal hydroxide or salt, since an excess decreases the hydrocarbon-converting activity of the catalyst; the optimum proportion is preferably first determined by trial with small portions of the catalyst. After the treatment with the dilute alkaline solution, it is advantageous to wash or rinse the catalyst with two or three changes of distilled water, to remove excess alkaline solution and to remove any readily soluble alkali-metal salts. An alternative method of removing any residual acid that is relatively advantageous, because it is free from activity-decreasing propensities and is relatively more rapid, is to effect the heating above about 250° C. in a current of superheated steam, which preferably should contain a minor proportion, such as 5 to 15 per cent by volume, of molecular hydrogen to ensure that it is nonoxidizing. When this method is used, the final temperature preferably should be in the range of 550 to 600° C., and the heating may be followed by a brief flushing with hydrogen to remove adsorbed moisture.

One noteworthy advantage of the present invention is that roughly only two thirds of the usual proportion of alkali, such as ammonia, is used in the preparation of the catalysts.

The following examples illustrate a few of the many aspects of the invention, which should not be unduly limited by the specific materials, conditions, and the like that are mentioned.

Example I

To 400 grams of chromium nitrate nonahydrate $(Cr(NO_3)_3.9H_2O)$ melted in its own water of crystallization, 140 milliliters of 28 per cent ammonia solution was added with stirring. The transitory precipitate which formed upon addition of the ammonia was completely peptized or dissolved when the mixture was heated to about 90° C. and was digested at this temperature for about 20 minutes. The resulting hot sol was poured upon 1000 grams of Activated Alumina pellets in an evacuated container, and the mixture was stirred, until all or nearly all of the sol was deposited on or in the pellets. The sol-impregnated pellets were allowed to stand overnight under a pressure of 2 atmospheres of nitrogen and then were dried in air at a temperature of 65° C. for nine days before use. The catalyst preparation was heated to 215° C. in a stream of hydrogen in a period of 200 minutes and was kept at this temperature for 45 minutes. It was then heated to about 575° C. in a period of 105 minutes and was tested for the dehydrogenation of normal butane to butylenes at a pressure of approximately 1 atmosphere and a space velocity of 1000 volumes (NTP) per volume per hour. The catalyst effected a constant conversion of 30 mol per cent, while the temperature was maintained in a range of 575° to 635° C., for a period of 165 minutes. A catalyst of the same calculated composition but made by impregnating alumina pellets with a solution of chromium nitrate effected a constant conversion of 30 mol per cent in the same temperature range for a period of only 150 minutes.

Example II

To 400 grams of chromium nitrate nonahydrate $(Cr(NO_3)_3.9H_2O)$ and 112 grams of aluminum nonahydrate $(Al(NO_3)_3.9H_2O)$ melted in their own water of crystallization, was added slowly, with stirring, 140 milliliters of 28 per cent ammonia. The mixture was heated and digested with stirring as in Example I, until the precipitate, which was formed upon addition of the ammonia, was completely peptized or redissolved. The hot sol was then poured onto 1000 grams of activated aluminum oxide pellets, and sufficient hot water was added so that the diluted sol completely covered the pellets. The mixture was placed under a pressure of 2 atmospheres of nitrogen for about 20 hours. The excess water was then removed by subjecting the mixture, heated to 60 to 70° C., to evacuation. The sol-containing pellets were then dried for 9 days in an oven at a temperature of 55 to 60° C. The catalyst was heated slowly to 215° C. in a stream of hydrogen, was maintained at this temperature for about an hour, and was then heated slowly to the operating temperature of about 575° C. for dehydrogenation of normal butane to butylenes as described in Example I. It effected a constant conversion of 30 mol per cent for a period of 150 minutes. A chromium oxide-aluminum oxide catalyst of the same calculated composition but prepared by impregnating the pellets with a solution of the two nitrates effected a constant conversion of 30 mol per cent for a period of only 120 minutes.

Example III

To a heated solution of 400 grams of chromium nitrate nonahydrate $(Cr(NO_3)_3.9H_2O)$ and 33 grams of zirconyl nitrate dihydrate $$(ZrO(NO_3)_2.2H_2O)$$

which were melted in their own water of crystallization, was added slowly, with stirring, 140 milliliters of 28 per cent ammonia. The mixture was digested until the precipitate which formed upon addition of the ammonia had become completely peptized or redissolved. The resulting sol was poured onto 1000 grams of activated aluminum oxide pellets and was allowed to stand overnight under a pressure of 2 atmospheres of nitrogen at a temperature of 65° C. The excess water was then removed by subjecting the mixture, heated to 60 to 70° C., to evacuation. The pellets were dried in an oven at 55 to 60° C. for six days. The catalyst was heated to 210° C. in a stream of hydrogen in a period of 200 minutes, was kept at this temperature for 60 minutes, and was then heated to the operating temperature in a period of 135 minutes. When used for dehydrogenation of normal butane to butylenes, as described in Example I, this catalyst effected a constant conversion of 30 mol per cent for a period of 160 minutes. A catalyst of the same composition, made by impregnating activated aluminum oxide pellets with a solution of the two salts without the use of ammonia, gave a constant-conversion of 30 mol per cent for a period of only 120 minutes.

For the sake of simplicity, in the foregoing examples only a few of the many possible catalysts that may be prepared by the practice of this invention are mentioned, but it is believed that together with the general teachings contained herein, they are adequate as illustrations. Although in these examples, the application of these catalysts has been confined to the dehydrogenation of butane, catalysts prepared in this manner are equally applicable to the dehydrogenation of other paraffin hydrocarbons; to the dehydrogenation of olefins to the corresponding diolefins; to dehydrocyclization, cyclization or aromatization of aliphatic hydrocarbons; and to other reactions known to be promoted by the type of catalyst concerned. The chromium-containing supported catalysts prepared in accordance with this invention are suited, because of the ease and economy of preparation, for the commercial dehydrogenation of aliphatic hydrocarbons in the temperature range of about 400 to 700° C.

Since this invention may be practiced otherwise than as specifically described and illustrated, and since many modifications of it will be obvious to those skilled in the art of catalyst preparation, the invention should not be restricted except as specified in the appended claims.

I claim:

1. A process of preparing a catalyst comprising chromium oxide supported on a porous granular catalyst carrier material which comprises forming a hydrosol by the addition of a concentrated aqueous ammonia solution to a concentrated aqueous solution of a water-soluble chromium salt of a monobasic acid in an amount approximately two thirds of the stoichiometrical equivalent of said salt and less than the amount required to form a permanent precipitate, impregnating the porous granular catalyst-carrier material with said hydrosol and thereafter removing a substantial portion of the excess liquid therefrom, drying the resulting impregnated catalyst-carrier material, and thereafter heating it at a temperature within the range of approximately 250° to approximately 600° C. while passing a current of superheated steam containing approximately 5 to approximately 15 per cent by volume of molecular hydrogen thereover.

2. A process of preparing a catalyst comprising chromium oxide supported on a porous granular catalyst-carrier material which comprises forming a hydrosol by the addition of a concentrated aqueous ammonia solution to a concentrated aqueous solution of water-soluble chromium-containing metal salts of a monobasic acid in an amount approximately two-thirds of the stoichiometrical equivalent of said salts and less than the amount required to form a permanent precipitate, impregnating the porous granular catalyst-carrier material with said hydrosol and thereafter removing a substantial portion of the excess liquid therefrom, drying the resulting impregnated catalyst-carrier material, heating the resulting impregnated catalyst-carrier material at a temperature within the range of approximately 200° C. to approximately 250° C. while passing a current of hydrogen thereover until substantial liberation of moisture has ceased, and thereafter heating it to a temperature within the range of approximately 250° C. to approximately 600° C. while passing a current of superheated steam containing approximately 5 to approximately 15 per cent by volume of molecular hydrogen thereover.

3. A process of preparing a catalyst comprising chromium oxide supported on a porous granular catalyst-carrier material which comprises forming a hydrosol by the addition of a concentrated aqueous ammonia solution to a concentrated aqueous solution containing a salt of a monobasic acid and chromium in an amount approximately two-thirds of the stoichiometrical equivalent of said salt and less than the amount required to form a permanent precipitate, impregnating the porous granular catalyst-carrier material with said hydrosol and thereafter removing a substantial portion of the excess liquid therefrom, drying the resulting impregnated catalyst-carrier material, and thereafter heating the resulting impregnated catalyst-carrier material at a temperature within the range of approximately 200° to approximately 250° C. while passing a current of hydrogen thereover until substantial liberation of moisture has ceased.

4. A process of preparing a catalyst comprising chromium oxide supported on a porous granular catalyst-carrier material which comprises forming a hydrosol by the addition of a concentrated aqueous ammonia solution to a concentrated aqueous solution of chromium nitrate in an amount approximately two-thirds of the stoichiometrical equivalent of the chromium nitrate and less than the amount required to form a permanent precipitate, impregnating the porous granular catalyst-carrier material with said hydrosol and thereafter removing a substantial portion of the excess liquid therefrom, drying the resulting impregnated catalyst-carrier material, and thereafter heating it at a temperature within the range of approximately 200° C. to approximately 250° C. while passing a current of hydrogen thereover until substantial liberation of moisture has ceased.

5. A process of preparing a catalyst comprising chromium oxide and aluminum oxide supported on a porous granular carrier material which comprises forming a hydrosol by the addition of a concentrated aqueous ammonia solution to a concentrated aqueous solution of a mixture of chromium and aluminum nitrates in an amount approximately two-thirds of the stoichiometrical equivalent of said salts and less than the amount required to form a permanent precipitate, impregnating the porous granular catalyst-carrier material with said hydrosol and thereafter removing a substantial portion of the excess liquid therefrom, drying the resulting impregnated catalyst-carrier material, and thereafter heating it at a temperature within the range of approximately 200° C. to approximately 250° C. while passing a current of hydrogen thereover until substantial liberation of moisture has ceased.

MARYAN P. MATUSZAK.

REFERENCES CITED

The following references are of record in the file of this patent:

UNITED STATES PATENTS

| Number | Name | Date |
|---|---|---|
| 2,085,129 | Stoemener | June 29, 1937 |
| 2,236,514 | Burk et al. | Apr. 1, 1941 |
| 2,288,336 | Welty, Jr., et al. | June 30, 1942 |
| 2,258,111 | Engel | Oct. 7, 1941 |
| 2,033,374 | Gayer | Mar. 10, 1936 |
| 2,156,903 | Ruthruff | May 2, 1939 |
| 2,324,067 | Connolly | July 13, 1943 |
| 2,184,235 | Groll et al. | Dec. 19, 1939 |
| 2,156,904 | Ruthruff | May 2, 1939 |
| 2,244,414 | Matuszak | Sept. 1, 1942 |

FOREIGN PATENTS

| Number | Country | Date |
|---|---|---|
| 484,962 | British | May 12, 1938 |